D. B. BARDIN & E. L. NORRIS.
OIL RING.
APPLICATION FILED NOV. 18, 1913.
1,111,941.
Patented Sept. 29, 1914.
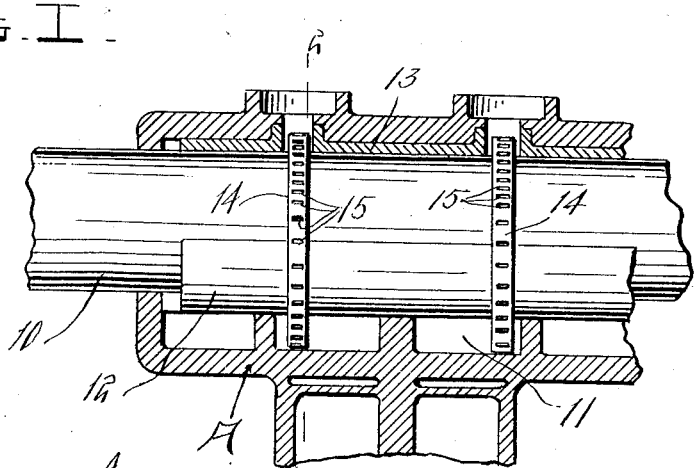
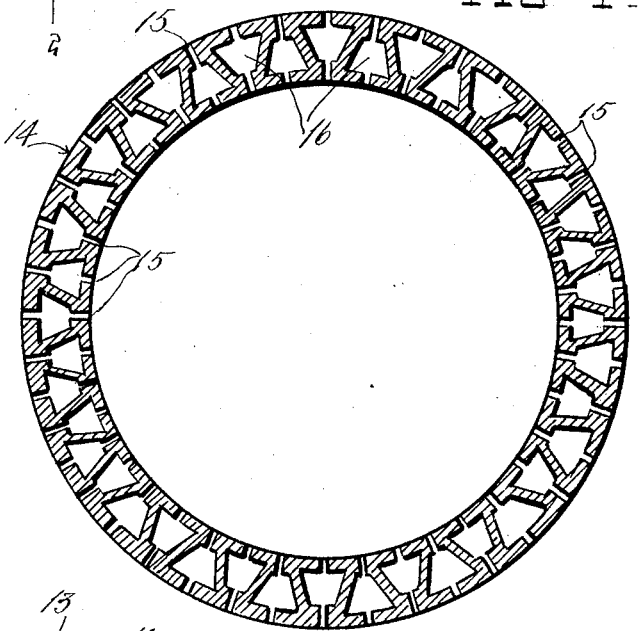
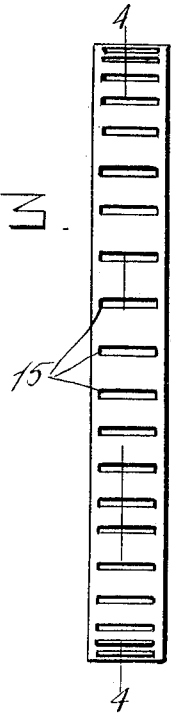
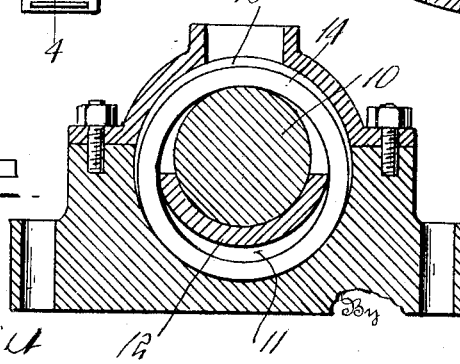
Inventors
D. B. Bardin.
E. L. Norris.

UNITED STATES PATENT OFFICE.

DAVID B. BARDIN AND EMMETT L. NORRIS, OF BREWSTER, FLORIDA.

OIL-RING.

1,111,941.   Specification of Letters Patent.   Patented Sept. 29, 1914.

Application filed November 18, 1913. Serial No. 801,655.

*To all whom it may concern:*

Be it known that we, DAVID B. BARDIN and EMMETT L. NORRIS, citizens of the United States, residing at Brewster, in the State of Florida, have invented certain new and useful Improvements in Oil-Rings; and we do hereby declare the following to be a full, clear, and exact description of the invention, such as will enable others skilled in the art to which it appertains to make and use the same.

This invention relates to oil rings for shaft bearings.

The object of the invention resides in the provision of an oil ring which will efficiently gather the oil from the oil reservoir at the base of the bearing and transfer same to the top side of the shaft and deposit the oil upon the latter.

A further object of the invention resides in the provision of an oil ring which will be efficient in use.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a vertical longitudinal section through a shaft bearing having the improved oil ring associated therewith; Fig. 2, a section on the line 2—2 of Fig. 1; Fig. 3, a plan view on an enlarged scale of the oil ring detached from the bearing, and Fig. 4, a section on the line 4—4 of Fig. 3.

Referring to the drawing A indicates generally a bearing in which is rotatably mounted a shaft 10. The bearing A is provided in its lower portion with the usual oil reservoir 11 and this bearing further includes liners 12 and 13 which directly engage the shaft 10. Supported upon and extending around the shaft 10 are the improved oil rings 14 the lower portions of which extend into the oil contained in the reservoir 11. Each of these rings 14 is provided with a plurality of radial passages 15 the central portions of which are enlarged to form frusto pyramidal pockets 16, the pockets of adjacent passages 15 being arranged oppositely.

During the rotation of the shaft 10 it will be obvious that the rings 14 will also be rotated. During this rotation of the rings 14 the outer ends of the passages 15 will pass into the oil contained in the reservoir 11 and a certain amount of this oil will enter the pockets 16 where it will be confined until said pocket reaches a position above the shaft 10 when the oil contained in the pocket will be discharged through the inner end of the passage 15 and upon the shaft 10 to effect the proper lubrication of the bearing.

While the ring has been shown in this instance as constructed solid it will be apparent that same may be constructed in separate sections and these sections suitably connected together to form the complete ring.

What is claimed is:—

1. An oil ring comprising an annular body having a plurality of radial passages therethrough, said passages having their intermediate portions enlarged to form pockets.

2. An oil ring comprising an annular body having a plurality of radial passages therethrough, said passages having their intermediate portions enlarged to form frusto pyramidal shaped pockets.

3. An oil ring comprising an annular body having a plurality of radial passages therethrough, said passages having their intermediate portions enlarged to form frusto pyramidal shaped pockets, the pockets of adjacent passages being oppositely disposed.

In testimony whereof, we affix our signatures, in the presence of two witnesses.

DAVID B. BARDIN.
  EMMETT L. NORRIS.

Witnesses for David B. Bardin:
 E. V. WHIDDEN,
 J. O. WHIDDEN.
Witnesses to Emmett L. Norris:
 C. M. CHANDLEE,
 L. CHANDLEE.

---

Copies of this patent may be obtained for five cents each, by addressing the "Commissioner of Patents, Washington, D. C."